Patented May 14, 1940

2,200,969

UNITED STATES PATENT OFFICE 2,200,969

LAMINATED SAFETY GLASS

Joseph D. Ryan and James D. Gwyn, Toledo, Ohio, assignors to Libbey-Owens-Ford Glass Company, Toledo, Ohio, a corporation of Ohio No Drawing. Application December 31, 1936, Serial No. 118,567

3 Claims. (Cl. 49—81.5)

The present invention relates to the art of laminated safety glass manufacture and more particularly to plastic material suitable for use as the interlayer of such a composite structure.

More specifically, the invention concerns the employment of the so-called polyvinyl acetal resins plasticized with the sebacic acid esters or plasticizer mixtures including sebacic acid esters.

The polyvinyl acetal resins may be formed by reacting an aldehyde with either a completely or partially hydrolyzed polyvinyl acetate. Broadly speaking, these polyvinyl acetal resins are attractive to the laminated safety glass art in that when properly prepared as plastics and united with glas sheets, the resulting composited structure is quite stable to heat and light energy and offers considerable resistance to impact at the varying temperatures to which such glass may be expected to be subjected in normal uses.

The expression "polyvinyl acetal resin" covers a large field of materials and the properties of the various resins included in the field vary and can be greatly varied by changes or modifications in the materials used in preparing the resin. Likewise, the properties of the plastics produced from the resins vary widely, depending not only upon the composition of the resin itself but also upon the kind and amount of plastizer used with any particular resin.

Although the polyvinyl acetal resins can be produced in a number of different ways, it is the general practice to employ polyvinyl acetate and to then either partially or completely hydrolyze the polyvinyl acetate, partially hydrolyzed polyvinyl acetate resulting when the polyvinyl acetate is only partially hydrolyzed and polyvinyl alcohol resulting when the polyvinyl acetate is completely hydrolyzed. Either of these two resulting materials may then be reacted with an aldehyde to give the polyvinyl acetal resin.

It will be understood that various techniques or processes can be employed in getting the ultimate polyvinyl acetal resin, and it may be that the steps of hydrolyzing the polyvinyl acetate and reacting with aldehyde will not be performed as independent steps but accomplished in a single step treatment. It will therefore be understood that the present invention is not in any way concerned with the particular method or methods employed in the production of the polyvinyl acetal resin. However, the molecules of both the partially hydrolyzed polyvinyl acetate and the polyvinyl alcohol contain vinyl alcohol groups, and during the reaction step with the aldehyde, the aldehyde condenses with some of the vinyl alcohol groups present, resulting in the polyvinyl acetal resin formation. Most of our work in connection with the present invention has been carried on using polyvinyl acetal resins in which formaldehyde, butyraldehyde, and acetaldehyde have been employed.

The extent of reaction of the aldehyde with the vinyl alcohol groups present in the molecules of the polyvinyl alcohol or the partially hydrolyzed polyvinyl acetate has a bearing not only on the yield of polyvinyl acetal resin from the mix but the degree of condensation must proceed beyond a certain point to give a polyvinyl acetal resin which is not unduly susceptible to water. It is considered desirable in the laminated safety glass art to employ a plastic interlayer that is not water or moisture susceptible, thus avoiding the problem of protecting the marginal portions of the laminated safety glass with a weather-proof seal. Aside from the question of edge sealing, the matter of water susceptibility does not seem of prime importance, and a polyvinyl acetal resin may be employed which is water susceptible if the marginal portions of the laminated safety glass sheets are provided with the edge seal as is the practice with some safety glass manufacturers now using cellulosic plastics as the interlayer.

As will be appreciated, the plasticizer used with the resin also affects water susceptibility of the plastic. Polyvinyl acetal resins not unduly susceptible to water can be formed using the aldehydes above set forth when condensation with the polyvinyl alcohol or partially hydrolyzed polyvinyl acetate is carried to a point where approximately 65 to 70 percent of the alcohol groups present have reacted with the aldehyde. To the best of our knowledge, whenever polyvinyl alcohol or partially hydrolyzed polyvinyl esters are reacted with aldehydes, regardless of the proportions used, some of the vinyl alcohol groups in the resin molecule remain unreacted or as free alcohol groups.

Polyvinyl acetal resins are today available on the open market and there are known plasticizers for such resins. For example, the esters of phthalic acid, the toluene sulfonamides, the higher esters of the glycols, or polyglycols, are some of the well known plasticizers for these materials. In our work with plastics formed from the polyvinyl acetal resins for use as interlayers in laminated safety glass, we have found that the latent properties of said resins can be diminished or enhanced by proper selection and use of plasticizer material. A plasticizer to be suitable, insofar as the safety glass art is concerned, must of course be stable to light and heat energy and must have a sufficiently high boiling point and low vapor pressure that the plastic will not bubble or be otherwise unstable when subjected to the varying temperatures encountered in normal use. Further, if the glass is not to be edge sealed, the plasticizer as well as the resin must show adequate resistance to hydrolysis under the conditions of normal usage. The plasticizer must be such that the plastic made therewith will exhibit sufficient resistance to impact at varying temperatures, that is, normally high, medium, and low temperatures, as within a range from about 0° F. to 120° F. In addition to impact resistance, the plasticizer must not so affect the resin that the interlayer formed therefrom will be too soft at the higher range of temperature or too brittle at the lower range of temperature, the absence of undue softness at the higher range being particularly important from an installation standpoint as the glass must be able to withstand the customary pressure exerted thereon when placed in supporting frames or other mountings.

To be satisfactory, the plasticizer must be such that it will not exude or sweat out from the plastic to an objectionable extent, and certainly must not in any way adversely interfere with the adhesion of the plastic layer to the glass whether the plastic be bonded directly to the glass or through the intermediary of an adhesive layer. Furthermore, the properties of the plasticizer must be such that slight variations in the ratio of plasticizer to resin, which normally exists as a result of the plastic manufacture and subsequent storage of the plastic before use, will not seriously affect the breaking strength of the laminated safety glass at the varying temperatures to which it is exposed, and obviously the cost of the plasticizer must not make its use prohibitive in commercial production.

There are materials that are plasticizers for this type of resin which, when used as a plasticizer, completely destroy the desirable latent properties of the resin, giving a plastic wholly unsuited for safety glass use. Dibutyl tartrate and diethyl citrate are examples of this class of unsuited plasticizers.

We have experimented with and tested many materials (at least a hundred) as possible plasticizers for the commercially available polyvinyl acetal resins and for one reason or another we have rejected these plasticizers as failing to properly develop the desirable properties possessed by the polyvinyl acetal resins for safety glass uses. As a result of this very extensive and intensive work with plasticization of the polyvinyl acetal resins, we discovered and have proven that some of the sebacic acid esters are extremely desirable and superior as plasticizers for this purpose. Since most of the esters of sebacic acid we have experimented with to date are not available commercially, we prepared our own esters by reacting sebacic acid with an excess of the desired alcohol which was saturated with dry hydrochloric acid gas. The mixture was refluxed for several hours and the product recovered in the usual manner. Yields of 90% to 95% of the theoretical amount of ester were obtained based on the amount of sebacic acid used as the starting product. We anticipate that further development in the technique of producing these esters of sebacic acid will result in even greater yields with consequent lowering in cost.

As one complete example of a polyvinyl acetal resin used by us, the following data are given. Polyvinyl acetate having a viscosity of 15 centipoises in a molar benzene solution at 20° C. was hydrolyzed to the extent of 95%. This partially hydrolyzed polyvinyl acetate was then reacted with formaldehyde under such conditions (in presence of a catalyst) that approximately 90% of the hydroxyl groups present in the molecule were condensed with the aldehyde. An analysis of this resin gave the following results:

Percent aldehyde combined as polyvinyl acetal _____ 81.0
Percent of ester as polyvinyl acetate_____ 10.1
Percent of alcohol as polyvinyl alcohol_____ 7.2

With the type of resin just described, we have been unable to use dialkyl sebacic acid esters as the sole plasticizer in view of the fact that the resulting plastic made with dialkyl sebacic acid esters as plasticizer in sufficient amounts is slightly opaque and undergoes syneresis (exudation or sweating out of the plasticizer). We discovered, however, that this difficulty with the sebacic acid esters can be overcome in the case of the simple dialkyl esters of sebacic acid, namely, dimethyl and diethyl sebacates, by blending with them a second plasticizer compatible with the resin in all proportions, such as for example, dimethyl, diethyl, and dimethoxy phthalates, benzyl benzoate, diglycerol tetra acetate, and methyl phthalyl glycollate.

Dibutyl sebacate and the higher alkyl esters produce opaque plastics which undergo plasticizer exudation regardless of the kind or amount of the phthalate ester admixed with them. However, suitable mixtures of dimethyl phthalate or diethyl phthalate may be made with dimethyl or diethyl sebacate to yield satisfactory results.

The resin described above was plasticized in the following manner: 100 parts of the resin and 85 parts of a fifty-fifty mixture of dimethyl phthalate and dimethyl sebacate were mixed, and 12 x 12 inch samples of laminated safety glass were prepared by bonding a layer approximately .025 of an inch in thickness of the plastic between two sheets of glass using a proper adhesive. Broadly, our adhesive was prepared by taking some of the resin and treating it with an alkali to increase the polar groups thereof to render it peculiarly well adherent toward glass surfaces when plasticized. This adhesive was applied to the glass in thin films and when the sandwich was subjected to heat and pressure, a well bonded sheet of laminated glass resulted. To test the glass, it was impacted with a freely falling two pound steel ball at different temperatures, with the following results: at 0° F., 16 feet; at 75° F., in excess of 21½ feet; at 120° F., 11 feet, with more than 50% of the samples tested.

Based on the work done by us, it appears that the plasticizer mixture may vary from 70 parts of dimethyl sebacate and 30 parts of dimethyl phthalate to 30 parts of dimethyl sebacate to 70 parts of dimethyl phthalate.

If diethyl sebacate is used with dimethyl phthalate, the range of plasticizers which will produce non-exuding transparent plastics (having in mind the plastic formula described above) varies from 25 parts of diethyl sebacate and 75 parts of dimethyl phthalate to 65 parts of diethyl sebacate and 35 parts of dimethyl phthalate.

As a second example of plasticization of this particular resin, we mixed 100 parts of the resin with 85 parts of plasticizer composed of 35 parts of dimethyl sebacate and 65 parts of diethyl phthalate. As in the case of the first example, 12 x 12 inch samples of safety glass were made and impacted with a two pound steel ball with the following results: At 0° F., 14 feet; 75° F., in excess of 21½ feet; 120° F., 10 feet. It appears that the ratio of dimethyl sebacate to diethyl phthalate can be varied in this plasticizer mixture from 35 parts dimethyl sebacate and 65 parts of diethyl phthalate to 20 parts of dimethyl sebacate and 80 parts of diethyl phthalate. When diethyl sebacate is used with diethyl phthalate, our results indicated that about 25% of diethyl sebacate is the maximum that can be employed in the mixture when the plastic is to be used as an interlayer for safety glass.

It will be noted not only in connection with this particular plastic mix, but also as to the other plastics herein disclosed that if it is desirable to have a laminated safety glass more or less strong at high and low temperatures, the ratio of the plasticizer mixture to the resin can be varied to accomplish the desired results. For example, if it is desired to prepare a laminated safety glass that will be more resistant at 0° F. at a sacrifice of resistance at 120° F. to impact, 100 parts of the plasticizer could be used instead of the 85 parts mentioned in the two examples above.

We wish to point out that it is ordinarily desirable to use as much of the sebacic acid ester as plasticizer in the mix as possible without creating a plastic sheet tending toward opacity or in which the plasticizer exudes excessively from the plastic, because best results for safety glass purposes are obtained with the greatest permissible amount of sebacic acid ester plasticizer contained in the plastic. As compared to the sebacic acid ester plasticizers, the esters of phthalic acid are inferior plasticizers (although superior to most other plasticizers) and when added to the mixture serve as diluents, so to speak, diminishing the effectiveness of the sebacic acid esters. It will thus be obvious that the sebacic acid esters, when used as plasticizers, promote and enhance the desirable properties of the polyvinyl acetal resin as a plastic interlayer for laminated safety glass.

This same resin, referred to herein as resin No. 1 can likewise be plasticized with di (mono methyl ether of ethylene glycol) sebacate which is one of the class of dialkoxy sebacic acid esters, and when using this particular ester of sebacic acid it is not necessary to blend with it any other plasticizer because it works entirely satisfactorily without such addition. We have found that approximately 50 parts of this plasticizer per 100 parts of resin gives a resin plastic well suited for laminated glass.

As a second example of polyvinyl acetal resin (referred to herein as resin No. 2) plasticized in accordance with our invention, the following description of experimental work is given. Partially hydrolyzed polyvinyl acetate, preferably formed from polyvinyl acetate having a viscosity of 15 centipoises when measured in a molar solution of benzene at 20° C., was reacted with acetaldehyde under suitable conditions and in the presence of a catalyst. An analysis of the resulting polyvinyl acetal resin showed that the polyvinyl acetate was hydrolyzed to the extent of about 92% and that approximately 88% of the alcohol or hydroxyl groups of the partially hydrolyzed polyvinyl acetate had combined with the acetaldehyde in the finished resin. The analysis showed 79.5% aldehyde as polyvinyl acetal, 11% ester as polyvinyl acetate, and 9.1% alcohol as polyvinyl alcohol.

We found that this second resin can be plasticized with the dialkyl sebacates, for example, dimethyl, diethyl, or dibutyl sebacates, as the sole plasticizer with exceedingly satisfactory results. In other words, with this type of resin made using the acetaldehyde in lieu of the formaldehyde, the dialkyl sebacates yield plastics which are transparent and not subject to objectionable syneresis even when the requisite amount of such sebacates are included to give a proper plastic for safety glass purposes and without the presence of any esters of phthalic acid or other compatible plasticizing materials. In one series of tests, 100 parts of the resin was plasticized with 50 to 60 parts of dimethyl sebacate. Samples of 12 x 12 inch sheets of safety glass were produced by laminating a layer of this resin plastic, approximately .025 of an inch in thickness, between glass sheets, and apparently no adhesive was required to get satisfactory bonding between the plastic and glass. Obviously, however, adhesives can be used to insure satisfactory permanent bonding between the plastic and glass. These test pieces were then impacted with a freely falling two pound steel ball and 50% of the samples tested supported the ball at 0° F., 10 feet; 75° F., 21½ feet; 120° F., 8 feet.

Although the sebacic acid esters can be used as the sole plasticizer to give a transparent sheet free from objectionable exudation of plasticizer, the plastic sheet will tolerate esters of phthalic acid such as dimethyl, diethyl, and dibutyl phthalates in proportions such as given in the examples set forth in connection with resin No. 1, and, for sake of economy or the like, mixtures of the dialkyl sebacic acid esters and esters of phthalic acid can be employed.

A third resin was formed (resin No. 3) differing from resins Nos. 1 and 2 not only in aldehyde used but also, in lieu of reacting an aldehyde with the partially hydrolyzed polyvinyl acetate, the third resin was made by reacting aldehyde with polyvinyl alcohol. The aldehyde used was butyraldehyde and the polyvinyl acetate, from which the polyvinyl alcohol was produced, had a viscosity in a molar benzene solution at 20° C. of 25 centipoises. The polyvinyl alcohol so formed was then reacted with butyraldehyde under suitable conditions to yield a resin in which the aldehyde had reacted with the alcohol groups available to the extent of about 72%. Analysis of the resin showed 81.2% aldehyde combined as polyvinyl acetal, .57% ester as polyvinyl acetate, and 19.6% alcohol as polyvinyl alcohol.

As in the case of resin No. 2 described above, we found that the dialkyl sebacates such as dimethyl, diethyl, and dibutyl sebacates, can be used as lone plasticizers for resin No. 3, and our preferred mixture consists of 100 parts of the resin with 50 parts of dibutyl sebacate. This resin can be bonded directly to glass when subjected to heat and pressure without the employment of adhesive but, as before stated, adhesives can be used if preferred. We made laminated safety glass by bonding layers of plastic, approximately .025 of an inch in thickness, between 12 x 12 inch sheets of glass and then impacted them with a freely falling two pound steel ball at different temperatures and found that in at least 50% of the pieces tested, the ball was supported at 0° F. for a distance of 16 feet; at 75° F., a distance in excess of 21½ feet; at 120° F., a distance of 8 to 10 feet. Again, as in the case of resin No. 2, instead of using straight dialkyl sebacic acid esters as plasticizer for resin No. 3, for sake of economy, etc., it may upon occasion be desirable to reduce the amount of sebacic acid ester required and add some cheaper compatible plasticizer such as some of the esters of phthalic acid.

Again, it may be pointed out that in using the mixed plasticizers for all of these polyvinyl acetal resins, as the plasticizer becomes richer in the phthalate ester (or other diluent plasticizer), the strength of the resulting plastic approaches the relatively poorer results obtained when using the phthalate ester alone.

In following the suggestions above outlined, it will be found that the dialkyl sebacates, when used as plasticizers for the polyvinyl acetal resins, are exceedingly stable to heat and light energy and possess a satisfactory high boiling point and low vapor pressure. Several thousand square feet of laminated safety glass have already been produced using as an interlayer polyvinyl acetal resins plasticized either with straight dialkyl sebacates or mixtures of dialkyl sebacates with compatible diluent plasticizers (esters of phthalic acid, etc.), and when following the precautions against opacity and plasticizer sweating out as above explained, the plastic sheeting can be easily produced having a definite and predetermined composition, with the plastic layer being, practically speaking, water insoluble, and possessing high resistance to hydrolysis, apparently making it unnecessary to edge seal laminated safety glass made therewith.

The esters of sebacic acid apparently are not available commercially with the possible exception of dibutyl sebacate which is now understood can be obtained in limited quantities. Therefore, it has been necessary for us to prepare or to have prepared at our direction the various esters of sebacic acid which we have developed as plasticizing agents for these polyvinyl acetal resins. Preparation of these materials has involved development of technique, etc., to get proper yields of esters of sebacic acid of suitable purification, etc. However, we have been informed that said esters can and will be produced in commercial quantities at reasonable cost. To date, we have actually prepared and satisfactorily used the following esters of sebacic acid as plasticizing agents for polyvinyl acetal resins:

(1) Dialkyl sebacates:
   (a) Dimethyl sebacate
   (b) Diethyl sebacate
   (c) Dibutyl sebacate (2) Dialkoxy sebacic acid esters:
   (a) Di (mono methyl ether of ethylene glycol) sebacate
   (b) Di (mono ethyl ether of ethylene glycol) sebacate (3) Di (polyglycol ether) esters of sebacic acid:
   (a) Di (ethyl ether of diethylene glycol) sebacate
   (b) Di (butyl ether of diethylene glycol) sebacate (4) Di (tetra hydro furfuryl) sebacate We have prepared and tested all of these derivatives of sebacic acid and contemplate preparing additional derivatives of sebacic acids as promptly as possible and testing them for use as plasticizers for the polyvinyl acetal resins. All of the sebacic acid plasticizers so far produced and tried have given extremely satisfactory results, and it is our belief, based on our work to date, that all of the plasticizers produced from sebacic acid will give comparable results. As is obvious from the above, proportions may vary and perhaps different compatible diluent plasticizers may be employed with these sebacic acid plasticizers for best results. We claim to have discovered the important and highly satisfactory utility of the sebacic acid ester plasticizers in the plasticization of polyvinyl acetal resins of the general character herein specifically set forth in the production of plastic interlayers for use in the manufacture of laminated safety glass.

The plasticity of the plastic is affected by the viscosity of the resin as well as the kind and amount of the plasticizer, and accordingly if resin is used varying materially in this respect from the resins mentioned above, variations in plasticizer content may be required to give the desired results.

In the claims the expression "hydrolized polyvinyl ester" is intended to include both completely and partially hydrolyzed polyvinyl esters (such as acetate, etc.). In the foregoing description, specific examples of both completely and partially hydrolyzed polyvinyl esters are set forth. Also in connection with the aldehydes employed, it will be noted that all of them are saturated aldehydes.

In this application and in the claims, the word "compatible" is used in a sense to mean that when the materials are operative, they are compatible, while incompatible materials are not suitable for use. That is, when saying the materials are compatible herein, it is meant that the resin and plasticizer can be mixed in varying proportions, with the resin and plasticizer being permanently tolerant of one another, resulting in an adequately plasticized plastic from which the plasticizer will not exude or sweat out when in use and in which permanent transparence and freedom from brittleness is maintained. In other words, when the resin can be colloidalized with a desired amount of plasticizer to produce the intended plastic, with the component parts of the plastic maintaining their intended relationship without appreciable change over a period of time, it may be said that such materials are compatible with one another.

We claim:

1. Laminated safety glass comprising two sheets of glass and an interlayer of plastic bonded therebetween and comprising a polyvinyl acetal resin formed by the reaction of a saturated aldehyde on a hydrolyzed polyvinyl ester in which approximately sixty-five percent of the available hydroxyl groups of said hydrolysis product have been reacted with the aldehyde, and an ester of sebacic acid compatible therewith as a plasticizer for said polyvinyl acetal resin.

2. Laminated safety glass comprising two sheets of glass and an interlayer of plastic bonded therebetween and comprising a polyvinyl acetal resin formed by the reaction of a saturated aldehyde on a hydrolyzed polyvinyl ester in which approximately sixty-five percent of the available hydroxyl groups of said hydrolysis product have been reacted with the aldehyde, an ester of sebacic acid compatible therewith as a plasticizer for said polyvinyl acetal resin, and a compatible diluent plasticizer therefor.

3. Laminated safety glass comprising two sheets of glass and an interlayer of plastic bonded therebetween and comprising a polyvinyl acetal resin formed by the reaction of a saturated aldehyde on a hydrolyzed polyvinyl ester in which approximately sixty-five percent of the available hydroxyl groups of said hydrolysis product have been reacted with the aldehyde, and a dialkyl sebacate compatible therewith as a plasticizer therefor.

4. Laminated safety glass comprising two sheets of glass and an interlayer of plastic bonded therebetween and comprising a polyvinyl acetal resin formed by the reaction of a saturated aldehyde on a hydrolyzed polyvinyl ester in which approximately sixty-five percent of the available hydroxyl groups of said hydrolysis product have been reacted with the aldehyde, a dialkyl sebacate compatible therewith as a plasticizer therefor, and a compatible diluent plasticizer.

5. Laminated safety glass comprising two sheets of glass and an interlayer of plastic bonded therebetween and comprising a polyvinyl acetal resin formed by the reaction of a saturated aldehyde on a hydrolyzed polyvinyl ester in which approximately sixty-five percent of the available hydroxyl groups of said hydrolysis product have been reacted with the aldehyde, and a dialkoxy sebacate compatible therewith as a plasticizer therefor.

6. Laminated safety glass comprising two sheets of glass and an interlayer of plastic bonded therebetween and comprising a polyvinyl acetal resin formed by the reaction of a saturated aldehyde on a hydrolyzed polyvinyl ester in which approximately sixty-five percent of the available hydroxyl groups of said hydrolysis product have been reacted with the aldehyde, a dialkoxy sebacate compatible therewith as a plasticizer therefor, and a compatible diluent plasticizer.

7. Laminated safety glass comprising two sheets of glass and an interlayer of plastic bonded therebetween and comprising a polyvinyl acetal resin formed by the reaction of butyraldehyde on a hydrolyzed polyvinyl ester in which approximately sixty-five percent of the available hydroxyl groups of said hydrolysis products have been reacted with the butyraldehyde, and an ester of sebacic acid compatible therewith as a plasticizer for said polyvinyl acetal resin.

8. Laminated safety glass comprising two sheets of glass and an interlayer of plastic bonded therebetween and comprising a polyvinyl acetal resin formed by the reaction of a saturated aldehyde on a hydrolyzed polyvinyl ester and a dialkyl sebacate compatible therewith as a plasticizer therefor.

JOSEPH D. RYAN.
JAMES D. GWYN.